United States Patent
Elliott, Jr. et al.

(10) Patent No.: US 10,936,968 B2
(45) Date of Patent: Mar. 2, 2021

(54) TICKET ROUTING

(71) Applicant: ServiceNow, Inc., Santa Clara, CA (US)

(72) Inventors: Frank Wall Elliott, Jr., San Diego, CA (US); Fernando Ros, Carlsbad, CA (US); Carmine Mangione-Tran, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 898 days.

(21) Appl. No.: 15/588,295

(22) Filed: May 5, 2017

(65) Prior Publication Data
US 2018/0322412 A1  Nov. 8, 2018

(51) Int. Cl.
G06N 20/00 (2019.01)
G06Q 10/10 (2012.01)
G06N 7/00 (2006.01)
H04L 12/851 (2013.01)

(52) U.S. Cl.
CPC ............ *G06N 20/00* (2019.01); *G06N 7/005* (2013.01); *G06Q 10/103* (2013.01); *H04L 47/2441* (2013.01)

(58) Field of Classification Search
CPC ... G06F 16/285; G06F 30/20; H04L 41/5074; H04L 47/2441; E21B 43/16; E21B 43/20; E21B 2041/0028; E21B 43/25; C09K 8/58; C09K 2208/10; G06N 20/00; G06N 7/005; G06Q 10/103
See application file for complete search history.

(56) References Cited

U.S. PATENT DOCUMENTS

| | | | |
|---|---|---|---|
| 6,609,233 B1 | 8/2003 | Ensor | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,357,301 B1 | 4/2008 | Bajpay et al. | |
| 7,610,512 B2 | 10/2009 | Gerber | |
| 7,617,073 B2 | 11/2009 | Trinon | |
| 7,689,628 B2 | 3/2010 | Garg | |

(Continued)

OTHER PUBLICATIONS

Di Lucca et al., "An Approach to Classify Software Maintenance Requestion", IEEE, Oct. 6, 2002, pp. 93-102 (Year: 2002).*

(Continued)

*Primary Examiner* — Paulinho E Smith
(74) *Attorney, Agent, or Firm* — Fletcher Yoder PC

(57) ABSTRACT

A method includes receiving, at a processor, ticket data representing a ticket. The method further includes receiving, at the processor, description data representing a description of the ticket. The method further includes calculating, based on the description data, a first probability that the ticket corresponds to a first category and a second probability that the ticket corresponds to a second category. The method further includes determining an entropy value associated with routing the ticket data. The method further includes, in response to the entropy value satisfying a threshold and the first probability exceeding the second probability, routing the ticket data to a device associated with the first category.

19 Claims, 8 Drawing Sheets

(56) References Cited

U.S. PATENT DOCUMENTS

| | | |
|---|---|---|
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 2013/0198116 A1* | 8/2013 | Bhamidipaty ...... H04L 41/5074 706/12 |
| 2018/0211260 A1* | 7/2018 | Zhang .................... G06N 20/00 |

OTHER PUBLICATIONS

Agarwal et al., "SmartDispatch", Knowledge Discovery and Data Mining, Aug. 2012, pp. 1393-1401 (Year: 2012).*

Extended European Search Report and Opinion for European Application No. 18170386.9 dated Aug. 20, 2018; 13 pgs.

Di Lucca, et al.: "An approach to classify software maintenance requests", Proceedings IEEE International Conference on Software Maintenance, Montreal, Quebec, Canada, Oct. 3-6, 2002; IEEE International Conference on Software Maintenance, Oct. 3, 2002; pp. 93-102, IP010624809.

Shivali Agarwal et al.: "SmartDispatch", Knowledge Discovery and Data Mining, Aug. 12, 2012; pp. 1393-1401 (SP058007845).

* cited by examiner

TICKET ROUTING

TECHNICAL FIELD

Embodiments described herein generally relate to routing tickets in computer networks.

BACKGROUND ART

Today's technology allows computer networks of any number of computer devices. Such computer devices may include, for example, personal computers, laptops, television devices, cell phones, tablets, smart watches, and other devices. As computer networks grow, computerized service networks (e.g., incident tracking systems) may receive larger volumes of request data (e.g., ticket data). Manually routing such request data to destination devices may be cumbersome. In addition, incorrect routing of the request data may result in retransmissions that burden the service network, extend average resolution time for requests, consume storage resources of the service network, or a combination thereof.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

According to one embodiment of the present disclosure, a method for ticket routing includes receiving, at a processor, ticket data representing a ticket. The method further includes receiving, at the processor, description data representing a description of the ticket. The method further includes calculating, based on the description data, a first probability that the ticket corresponds to a first category and a second probability that the ticket corresponds to a second category. The method further includes determining an entropy value associated with routing the ticket data. The method further includes, in response to the entropy value satisfying a threshold and the first probability exceeding the second probability, routing the ticket data to a device associated with the first category.

In another embodiment of the present disclosure, an apparatus includes a processor and a memory device. The memory device stores instructions that, when executed by the processor, cause the processor to perform operations including receiving ticket data representing a ticket. The operations further include receiving description data representing a description of the ticket. The operations further include calculating, based on the description data, a first probability that the ticket corresponds to a first category and a second probability that the ticket corresponds to a second category. The operations further include determining an entropy value associated with routing the ticket data. The operations further include, in response to the entropy value satisfying a threshold and the first probability exceeding the second probability, routing the ticket data to a device associated with the first category.

In another embodiment of the present disclosure, a computer-readable storage medium stores instructions that, when executed by a processor, cause the processor to perform operations including receiving ticket data representing a ticket. The operations further include receiving description data representing a description of the ticket. The operations further include calculating, based on the description data, a first probability that the ticket corresponds to a first category and a second probability that the ticket corresponds to a second category. The operations further include determining an entropy value associated with routing the ticket data. The operations further include, in response to the entropy value satisfying a threshold and the first probability exceeding the second probability, routing the ticket data to a device associated with the first category.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
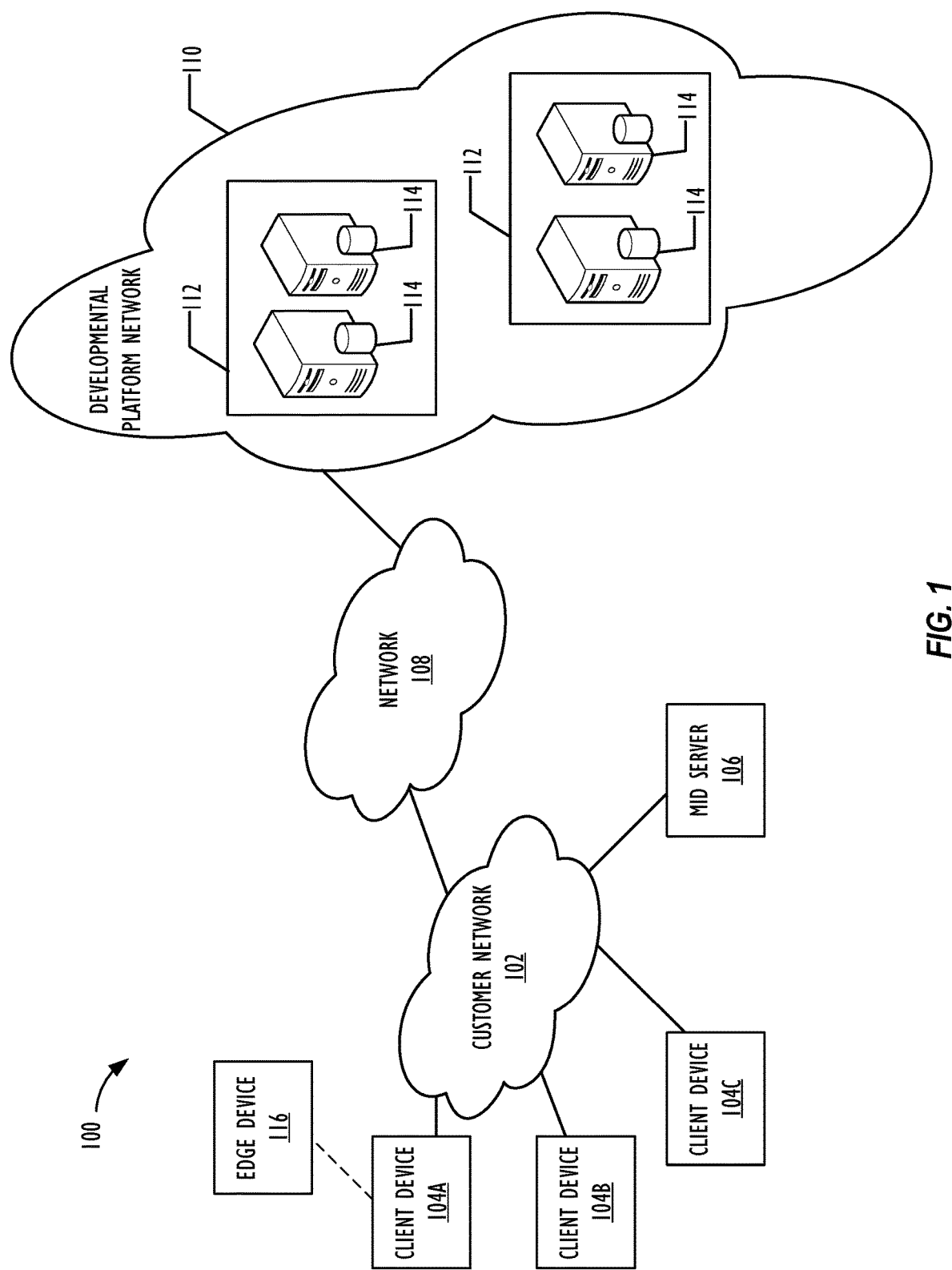
FIG. 1 is a schematic diagram of an embodiment of a network computing system where embodiments of the present disclosure may operate herein.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing device" may refer to a device that includes, but is not limited to a single computer, host, server, laptop, and/or mobile device.

As used herein, the term "network device" may refer to any device that is capable of communicating and transmitting data to another device across any type of network.

As used herein, the term "computing system" may refer to a single electronic computing device or network device that includes, but is not limited to a single computer, virtual machine, virtual container, host, server, laptop, and/or mobile device. The term "computing system may also refer to a plurality of electronic computing devices and/or network devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Sequences of method steps presented herein are provided as examples and are not meant to be limiting. Thus, methods according to the disclosure may be performed in an order alternative to that illustrated in the figures and described herein. To illustrate, a method described as including steps "A" and "B" may be performed with "A" either preceding or following "B," unless a specific order is indicated.

Systems and methods according to the present disclosure may enable routing of data based on entropy (e.g., uncertainty). In particular, ticket data associated with service tickets may be automatically routed in a service network by a computing device, such as a ticket routing server, based on an entropy value associated with routing the ticket data. The service network may include multiple devices or device components (e.g., memory devices, mobile computing devices, server computers, file partitions, data structures, etc.), each associated with a different service department (e.g., a human resources department, an information technology department, a legal department, etc.).

The ticket routing server may receive ticket data representing a ticket. The ticket routing server may further receive (e.g., extract from the ticket data) description data representing a description of the ticket. In some implementations, the description may include a collection of keywords. To illustrate, the ticket may be associated with a request for a new computer monitor and the description may include keywords "computer" and "monitor." Based on the keywords, the ticket routing server may determine a plurality of probabilities. A first probability of the plurality of probabilities may be associated with a likelihood that the ticket data should be routed to a device or device component associated with the human resources (HR) department. A second probability of the plurality of probabilities may be associated with a likelihood that the ticket data should be routed to a device or device component associated with the information technology (IT) department. A third probability of the plurality of probabilities may be associated with a likelihood that the ticket data should be routed to a device or device component associated with the legal department. Further, based on the plurality of probabilities, the ticket routing server may determine an entropy value (e.g., uncertainty value) associated with choosing to route the ticket data to a device or device component associated with one of the service departments. In response to determining that the entropy value satisfies (e.g., is less than) an entropy threshold, the ticket routing server may route the ticket data to the device or device component (e.g., the department) associated with a higher probability of the plurality of probabilities. In response to determining that the entropy value does not satisfy the entropy threshold, the ticket routing server may request input (e.g., from a user) indicating to which device or device component to route the ticket data.

Since entropy (e.g., uncertainty) in prediction may be inversely related to accuracy in prediction, automatically routing the ticket data based on the entropy satisfying the entropy threshold may enable the ticket routing server to achieve or approximate a specified (e.g., by user input, factory setting, etc.) routing accuracy when automatically routing ticket data. Accordingly, a ticket routing server operating according to the present disclosure may more accurately route tickets as compared to other systems. Further, requesting input (e.g., user input) in response to the entropy value not satisfying the entropy threshold, rather than in every case, may result in faster overall ticket data routing, as compared to purely manual systems.

FIG. 1 is a schematic diagram of an embodiment of a computing system 100, such as a cloud computing system, where embodiments of the present disclosure may operate herein. Computing system 100 may include a customer network 102, network 108, and developmental platform network 110. In one embodiment, the customer network 102 may be a local private network, such as local area network (LAN) that includes a variety of network devices that include, but are not limited to switches, servers, and routers. In another embodiment, the customer network 102 represents an enterprise network that could include one or more local area networks (LANs), virtual networks, data centers 112 and/or other remote networks. As shown in FIG. 1, the customer network 102 is able to connect to one or more client devices 104A-C so that the client devices are able to communicate with each other and/or with the developmental platform network 110. The client devices 104A-C may be computing systems and/or other types of computing devices generally referred to as Internet of Things that access cloud computing services, for example, via a web browser application or via an edge device 116 that may act as a gateway between the client device and the remote device. FIG. 1 also illustrates that the customer network 102 includes a management, instrumentation, and discovery (MID) servers 106 that facilitate communication of data between the developmental platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to a network 108. The network 108 may include one or more computing networks available today, such as other LANs, wide area networks (WAN), the Internet, and/or other remote networks, in order to transfer data between the client devices 104A-C and the developmental platform network 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network) wireless fidelity (Wi-Fi®) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the developmental platform network 110 may be a remote network (e.g., a cloud network) that is able to communicate with the client devices 104A-C via the customer network 102 and network 108. The developmental platform network 110 acts as a platform that provides additional computing resources to the client devices 104A-C and/or customer network 102. For example, by utilizing the developmental platform network 110, users of client devices 104A-C are able to build and execute applications, such as automated processes for various enterprise, IT, and/or other organization-related functions. In one embodiment, the developmental platform network 110 includes one or more data centers 112, where each data center 112 could correspond to a different geographic location. Within the data center 112 include a plurality of server instances 114. Each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary MySQL catalog).

To utilize computing resources within the developmental platform network 110, network operators may choose to configure the data centers 112 using a variety of computing infrastructures. In one embodiment, one or more of the data centers 112 are configured using a multi-tenant cloud architecture such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture suffer drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the developmental platform network 110, and customer-driven upgrade schedules.

In some embodiments according to the present disclosure, the computing system 100 may correspond to a service network, such as an incident tracking system. One of the data centers 112, the server instances 114, or a combination thereof may correspond to a ticket routing server that routes ticket data based on entropy, as described herein. Further, various ones of the data centers 112, the server instances 114, or combinations thereof may correspond to different service departments (e.g., an HR department, an IT department, a legal department, etc.). Thus, the computing system 100 may enable entropy based ticket data routing.

Figure 2:
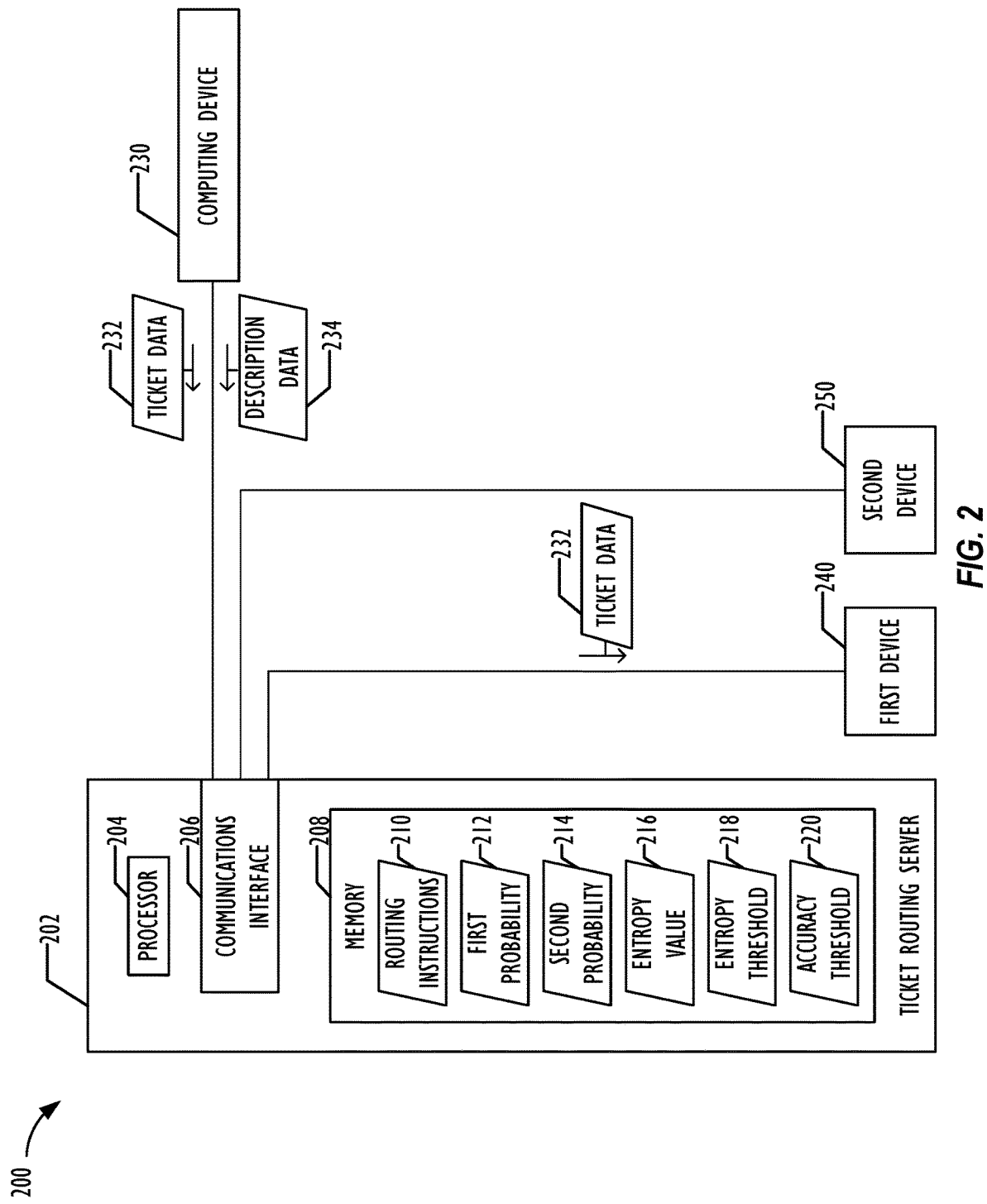
FIG. 2 is a diagram of a system for ticket routing.

Referring to FIG. 2, a diagram of a system 200 for ticket routing is shown. The system 200 includes a ticket routing server 202. In some implementations, the ticket routing server 202 may correspond to one of the data centers 112 of FIG. 1, the server instances 114 of FIG. 1, or a combination thereof. The ticket routing server 202 includes a processor 204. The processor 204 may correspond to a central processor unit (CPU) or to another type of processor device. The ticket routing server 202 further includes a communications interface 206. The communications interface 206 may include one or more interfaces configured to communicate via various wired or wireless communication standards. While not illustrated, the ticket routing server 200 may further include a user interface device configured to present output to a user and/or to receive input from the user. For example, the user interface device may include a touch screen, a mouse, a keyboard, a display screen, speakers, or a combination thereof. The ticket routing server 202 further includes a memory device 208. The memory device 208 may include volatile or non-volatile random access memory (RAM), read only memory (ROM), a solid state drive device, another type of memory device, or a combination thereof. In the example illustrated in FIG. 2, the memory device 208 stores routing instructions 210. The routing instructions 210 may be executable by the processor 204 to perform one or more of the processes and methods described herein. In the example illustrated in FIG. 2, the memory device 208 further stores a first probability 212, a second probability 214, an entropy value 216, an entropy threshold 218, and an accuracy threshold 220. The first probability 212, the second probability 214, the entropy value 216, the entropy threshold 218, and the accuracy threshold 220 are described further below.

The system 200 further includes a computing device 230 in communication with the ticket routing server 202. The computing device 230 may include a workstation, a server, a mobile device, an internet of things device, or another type of computing device. In some implementations, the computing device 230 corresponds to one or more of the client devices 104A-C of FIG. 1, the MID server 106, the edge device 116, or a combination thereof. While illustrated as directly coupled to the ticket routing server 202, the computing device 230 may communicate with the ticket routing server 202 via a network.

The system 200 further includes a first device 240 and a second device 250 in communication with the ticket routing server 202. The first device 240 may include a memory device, a mobile computer device, a server computer device, another type of computer device, or any other type of device. The second device 250 may include a memory device, a mobile computer device, a server computer device, another type of computer device, or any other type of device. The first device 240 may be associated with a first category (e.g., human resources) and the second device 250 may be associated with a second category (e.g., information technology). While the example of FIG. 2 illustrates the first device 240 and the second device 250 as independent devices, in some embodiments, the first device 240 and the second device 250 may be components of a common device. For example, the first device 240 may correspond to a first memory device of the common device and the second device 250 may correspond to a second memory device of the common device. Further, in some embodiments according to the disclosure, the first device 240 and the second device 250 may be replaced by logical structures. For example, the first device 240 may correspond to a first part of a file or data structure associated with the first category and the second device 250 may correspond to a second part of a file or data structure associated with the second category. While illustrated as directly coupled to the ticket routing server 202, one or both of the first device 240 and the second device 250 may communicate with the ticket routing server 202 via a network.

In operation, the ticket routing server 202 may receive, via the communications interface 206, ticket data 232 and description data 234 from the computing device 230. In alternate examples, the ticket routing server 202 may receive the ticket data 232, the description data 234, or a combination thereof from an intermediate device. For example, a help application executing at the computing device 230 or the intermediate device may generate the ticket data 232, the description data 234 or a combination thereof. In alternative embodiments, the ticket routing server 202 may generate the ticket data 232, the description data 234, or a combination thereof based on data received from the computing device 230, the intermediate device, or a combination thereof. To illustrate, the ticket routing server 202 may execute a help application configured to generate the ticket data 232, the description data 234, or a combination thereof responsive to input from the computing device 230 and/or the intermediate device.

The ticket data 232 may represent a ticket associated with a tracking system (e.g., an issue tracking system), and the description data 234 may represent a description of the ticket. To illustrate, the ticket may be associated with a request (e.g., from a user of the computing device 230) for assistance and the description of the ticket may include information describing the request. For example, the ticket data 232 may represent a ticket associated with request for a pay raise, a request for new computer equipment, a request for legal assistance, or any other type of request. The ticket data 232 may include a ticket identifier (e.g., a combination of alphanumeric characters). The description data 232 may represent a description of the request. For example, the description may include keywords associated with the request, flags associated with the request, a priority indicator associated with the request, a user account associated with the request, or a combination thereof.

The description data 234 may be included in the ticket data 232 or distinct from the ticket data 232. For example, the description data 234 may be included in metadata fields of the ticket data 232. In another example, the description data 234 may correspond to a transcript of a communication between a user of the computing device 230 and another entity regarding the request for assistance. The other entity may include a virtual agent (e.g., software configured to provide assistance) or a human agent. In some examples, the ticket routing server 202 may receive the ticket data 232 and the description data 234 from different sources. For example, the ticket routing server 202 may receive the ticket data 232 from the computing device 230 and receive the description data 234 from a server that executes the virtual agent. The description data 234 may include the ticket identifier. Based on the ticket identifier, the processor 204 may match the description data 234 to the ticket data 232.

The processor 204 (e.g., executing the routing instructions 210) may receive the ticket data 232 and the description data 234 (e.g., from the communications interface 206). Based on the description data 234 the processor 204 may determine the first probability 212 and the second probability 214. The first probability 212 indicates a probability that the ticket data 232 corresponds to the first category associated with the first device 240. The second probability 214 indicates a probability that the ticket data 232 corresponds to the second category associated with the second device 250. In some embodiments, the processor 204 may utilize formulas or rules included in the routing instructions 210 to determine the first probability 212 and the second probability 214. The processor 204 may store the first probability 212 and the second probability 214 in the memory device 208.

The processor 204 may further calculate the entropy value 216 based on the description data 234. The entropy value 216 may indicate a degree of uncertainty that a categorization of the ticket data 232 determined by the ticket routing server 202 will be correct. In some examples, if the first probability 212 is equal to "x" and the second probability 214 is equal to "y", the entropy value 216 may equal $-x \log_2 x - y \log_2 y$. More generally, in embodiments in which the ticket routing server 202 routes tickets between n categories, the entropy value 216 may equal $-\Sigma_1^n P(x_i) \log_b P(x_i)$, where b may be any number and $P(x_i)$ is the probability that the ticket data 232 corresponds to category $x_i$.

The processor 204 may compare the entropy value 216 to the entropy threshold 218 to determine whether to automatically categorize the ticket data 232. Since the entropy value 216 corresponds to a degree of uncertainty that a categorization of the ticket data 232 determined by the ticket routing server 202 will be correct, the entropy value 216 may be inversely related to an expected degree of accuracy in a decision to classify the ticket data 232 made by the processor 204. The processor 202 may set the entropy threshold 218 based on the accuracy threshold 220. Selection of the accuracy threshold 220 and mapping the accuracy threshold 220 to the entropy threshold 218 is explained further below. Thus, the processor 204 may achieve a selected (e.g., by user input) level of accuracy in automatic categorization of ticket data by automatically routing ticket data associated with an entropy value that satisfies the entropy threshold 218. The entropy value 216 may satisfy the entropy threshold 218 when the entropy value 216 is less than or equal to the entropy threshold 218.

In response to the entropy value 216 satisfying the entropy threshold 218, the processor 204 may initiate transmission of the ticket data 232, the description data 234, or a combination thereof based on one or both of the first probability 212 and the second probability 214 For example, the processor 204 may initiate transmission, via the communications interface 206, of the ticket data 232 to the first device 240 in response to the first probability 212 exceeding the second probability 214.

In an illustrative use case, the computing device 230 may execute a help application. A user of the computing device 230 may desire a pay raise. The user of the computing device 230 may input (e.g., via a user interface of the computing device 230) information regarding the desired pay raise to the help application. Based on the information the help application may generate the ticket data 232 and the description data 234. The description data 234 may represent keywords "Pay" and "raise." The computing device 230 may transmit the ticket data 232 and the description data 234 to the ticket routing server 202. The processor 204 may determine based on the key words "Pay" and "raise" that there is a 90% probability that the ticket data 232 is associated with the human resources category and a 10% probability that the ticket data 232 is associated with the information technology category. The processor 204 may determine based on the probabilities that the entropy value 216 is equal to $-0.9 \log_2 0.9 - 0.1 \log_2 0.1 \approx 0.469$. The processor 204 may determine that the entropy threshold 218 is equal to 0.5 based on the accuracy threshold 220 equaling 80%. As described further below, the processor 208 may determine the entropy threshold 218 based on a data structure (e.g., stored in the memory 208) that associates accuracy thresholds to entropy thresholds. Since 0.469 (e.g., the entropy value 216) is less than 0.5 (e.g., the entropy threshold 218), the processor 204 may determine to automatically route the ticket data 232. Further, since the ticket data 232 is more likely associated with the human resources department than the information services department, (e.g., because 0.9 is greater than 0.1), the processor 204 may determine to route the ticket data 232 to the human resources department (e.g., the first device 240).

Thus, the ticket routing server 202 may automatically route ticket data and/or description data to a destination in response to determining that an entropy value associated with the routing decision satisfies an entropy threshold associated with an accuracy threshold. Automatically routing ticket data based on entropy values may reduce a number of devices that receive ticket data that would be more appropriately received by a different device. Accordingly, the ticket routing server 202 may operate more accurately as compared to other ticket routing servers. Since fewer devices may incorrectly receive ticket data, the ticket routing server 202 may reduce an amount of storage capacity consumed across a network by duplicated and rerouted ticket data. Accordingly, the disclosure represents an improvement to computer technology. It should be noted that, while the disclosure provides examples of routing ticket data based on entropy values, other types of data may be routed based on entropy values as well. For example, an E-mail client may automatically address an E-mail message in response to determining that an entropy value associated with addressing the E-mail message satisfies an entropy threshold.

Figure 3:
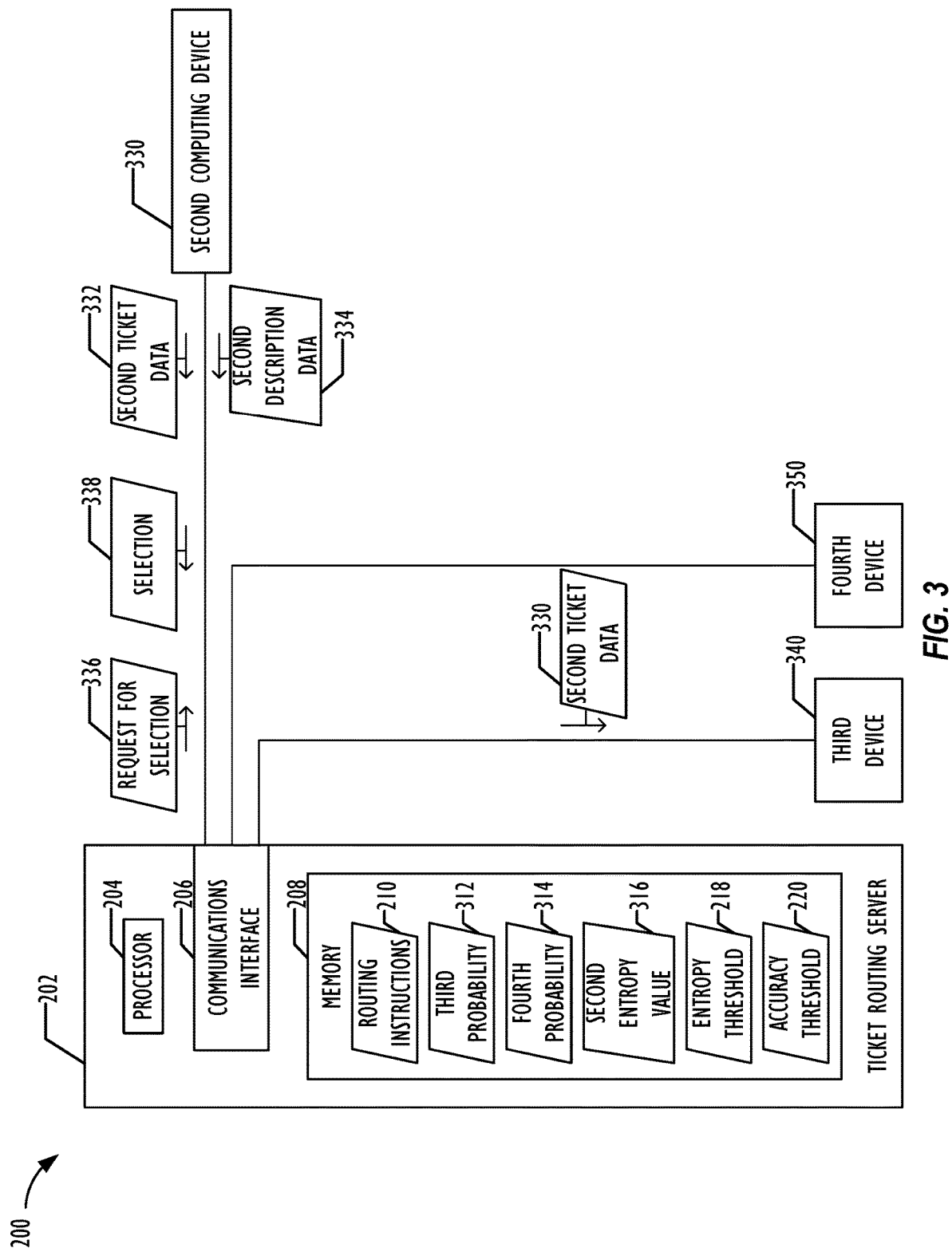
FIG. 3 is another diagram of a system for ticket routing.

Referring to FIG. 3, another diagram of the system 200 for ticket routing is shown. The diagram of FIG. 3 illustrates how the ticket routing server 202 may respond to ticket data for which an entropy value does not satisfy an entropy threshold. The operations described in connection to FIG. 3 may occur before, after, or during the operations described in connection to FIG. 2.

As illustrated in FIG. 3, the ticket routing server 202 may be in communication with a second computing device 330. The second computing device 330 may correspond to the computing device 230 of FIG. 2 or may be a different device. The second computing device 330 may include a workstation, a server, a mobile device, an internet of things device, or another type of computing device. In some implementations, the second computing device 330 corresponds to one or more of the client devices 104A-C of FIG. 1, the MID server 106, the edge device 116, or a combination thereof. While illustrated as directly coupled to the ticket routing server 202, the second computing device 330 may communicate with the ticket routing server 202 via a network.

As illustrated in FIG. 3, the ticket routing server 202 may be in communication with a third device 340 and a fourth device 350. The third device 340 may correspond to the first device 240 or may be a distinct device. The fourth device 350 may correspond to the second device 250 or may be a distinct device. The third device 340 may include a memory device, a mobile computer device, a server computer device, another type of computer device, or any other type of device. The fourth device 350 may include a memory device, a mobile computer device, a server computer device, another type of computer device, or any other type of device. The third device 340 may be associated with a third category (e.g., legal department) and the fourth device 350 may be associated with a fourth category (e.g., customer support). While the example of FIG. 3 illustrates the third device 340 and the fourth device 350 as independent devices, in some embodiments, the third device 340 and the fourth device 350 may be components of a common device. For example, the third device 340 may correspond to a first memory device of the common device and the fourth device 350 may correspond to a second memory device of the common device. Further, in some embodiments according to the disclosure, the third device 340 and the fourth device 350 may be replaced by logical structures. For example, the third device 340 may correspond to a first part of a file or data structure associated with the third category and the fourth device 350 may correspond to a second part of a file or data structure associated with the second category.

In operation, the ticket routing server 202 may receive, via the communications interface 206, second ticket data 232 and second description data 334 from the second computing device 330. In alternate examples, the ticket routing server 202 may receive the second ticket data 332, the second description data 334, or a combination thereof from an intermediate device. For example, a help application executing at the second computing device 330 or the intermediate device may generate the second ticket data 332, the second description data 334 or a combination thereof. In alternative embodiments, the ticket routing server 202 may generate the second ticket data 332, the second description data 334, or a combination thereof based on data received from the second computing device 330, the intermediate device, or a combination thereof. To illustrate, the ticket routing server 202 may execute a help application configured to generate the second ticket data 332, the second description data 334, or a combination thereof responsive to input from the second computing device 330 and/or the intermediate device.

The second ticket data 332 may represent a second ticket associated with the tracking system (e.g., an issue tracking system), and the second description data 334 may represent a description of the second ticket. To illustrate, the second ticket may be associated with a second request (e.g., from a second user of the second computing device 330) for assistance and the description of the second ticket may include information describing the request. For example, the second ticket data 332 may represent a second ticket associated with request for a pay raise, a request for new computer equipment, a request for legal assistance, or any other type of request. The second ticket data 332 may include a second ticket identifier (e.g., a second combination of alphanumeric characters). The second description data 332 may represent a description of the second request. For example, the description may include keywords associated with the request, flags associated with the second request, a priority indicator associated with the second request, a user account associated with the second request, or a combination thereof.

The second description data 334 may be included in the second ticket data 332 or distinct from the second ticket data 332. For example, the second description data 334 may be included in metadata fields of the second ticket data 332. In another example, the second description data 334 may correspond to a transcript of a communication between a second user of the second computing device 330 and another entity regarding the request for assistance. The other entity may include a virtual agent (e.g., software configured to provide assistance) or a human agent. In some examples, the ticket routing server 202 may receive the second ticket data 332 and the second description data 334 from different sources. For example, the ticket routing server 202 may receive the second ticket data 332 from the second computing device 330 and receive the second description data 334 from a server that executes the virtual agent. The second description data 334 may include the second ticket identifier. Based on the second ticket identifier, the processor 204 may match the second description data 334 to the second ticket data 332.

The processor 204 (e.g., executing the routing instructions 210) may receive the second ticket data 332 and the second description data 334 (e.g., from the communications interface 206). Based on the second description data 334 the processor 204 may determine a third probability 312 and a fourth probability 314. The third probability 312 indicates a probability that the second ticket data 332 corresponds to the third category associated with the third device 340. The fourth probability 314 indicates a probability that the second ticket data 332 corresponds to the fourth category associated with the fourth device 350. In some embodiments, the processor 204 may utilize formulas or rules included in the routing instructions 210 to determine the third probability 312 and the second probability 314. The processor 204 may store the third probability 312 and the fourth probability 314 in the memory device 208.

The processor 204 may further calculate a second entropy value 316 based on the second description data 334. The second entropy value 316 may indicate a degree of uncertainty that a categorization of the second ticket data 332 determined by the ticket routing server 202 will be correct. The processor 204 may calculate the second entropy value 316 based on the values of the third probability 312 and the fourth probability 314, as described above.

The processor 204 may compare the second entropy value 316 to the entropy threshold 218 to determine whether to automatically categorize the second ticket data 332. As explained above, entropy may be inversely related to an expected degree of accuracy. In response to the second entropy value 316 not satisfying the entropy threshold 218, the processor 204 may initiate transmission to the second computing device 330 (or another device) of a request 336 for selection of a category. The request 336 for selection may identify the categories to which the second ticket data 332 may be correspond and request that a device or a user select one of the identified categories. In some embodiments, the request 336 for selection may indicate that the second ticket data 332 more likely corresponds to one category than to another category. For example, the request 336 for selection may include the third probability 312 and the fourth probability 314. As another example, the request 336 for selection may list the third category and the fourth category in an order determined based on the third probability 312 and the fourth probability 314.

In response to the request 336 for selection, the second computing device 330 may transmit a selection 338 to the ticket routing server 202. The selection 338 may indicate one of the categories identified by the request 336 for selection. The processor 204 may receive the selection 338 and route the second ticket data 330 to the category indicated by the selection 338. For example, the processor 204 may route the second ticket data 330 to the third device 340 in response to the selection 338 indicated the third category.

In an illustrative use case, the second computing device 330 may execute a help application. A user of the second computing device 330 may desire more information on a warranty policy. The user of the second computing device 330 may input (e.g., via a user interface of the second computing device 330) information regarding request for help regarding the warranty policy to the help application. Based on the information the help application may generate the second ticket data 332 and the second description data 334. The second description data 334 may represent keywords "Warranty" and "policy." The second computing device 330 may transmit the second ticket data 332 and the second description data 334 to the ticket routing server 202. The processor 204 may determine based on the key words "Warranty" and "Policy" that there is a 50% probability that the second ticket data 332 is associated with the legal services category and a 50% probability that the second ticket data 332 is associated with the customer service category. The processor 204 may determine based on the probabilities that the second entropy value 316 is equal to $-0.5 \log_2 0.5 - 0.5 \log_2 0.5 \approx 1$. The processor 204 may determine that the entropy threshold 218 is equal to 0.5 based on the accuracy threshold 220 equaling 80%. As described further below, the processor 208 may determine the entropy threshold 218 based on a data structure (e.g., stored in the memory 208) that associates accuracy thresholds to entropy thresholds. Since 1 (e.g., the second entropy value 316) is greater than 0.5 (e.g., the entropy threshold 218), the processor 204 may determine to not automatically route the second ticket data 332.

Responsive to determining that the second entropy value 316 is greater than the entropy threshold 218, the processor 204 may initiate transmission, to the second computing device 330, of the request 336 for selection. The request 336 may indicate that the legal services category and the customer services category are equally likely to be the correct destination for the second ticket data 332. In response to the request 336, the second computing device 330 may present a notification to the user of the second computing device 330. The notification may request (e.g., in text, graphics, audio, etc.) that the user select one of the legal services category or the customer services category. In response to receiving user input, the second computing device 330 may generate the selection 338. The selection 338 may indicate that the user of the second computing device 330 selected the legal services category. Accordingly, based on the selection 338, the processor 204 may route the second ticket data 330 to the legal services department (e.g., to the third device 340).

Thus, the ticket routing server 202 may refrain from automatically routing ticket data and/or description data to a destination in response to determining that an entropy value associated with the routing decision does not satisfy an entropy threshold associated with an accuracy threshold. Refraining from automatically routing ticket data based on entropy values may reduce a number of devices that receive ticket data that would be more appropriately received by a different device. Accordingly, the ticket routing server 202 may operate more accurately as compared to other ticket routing servers. Accordingly, the disclosure represents an improvement to computer technology.

Figure 4:
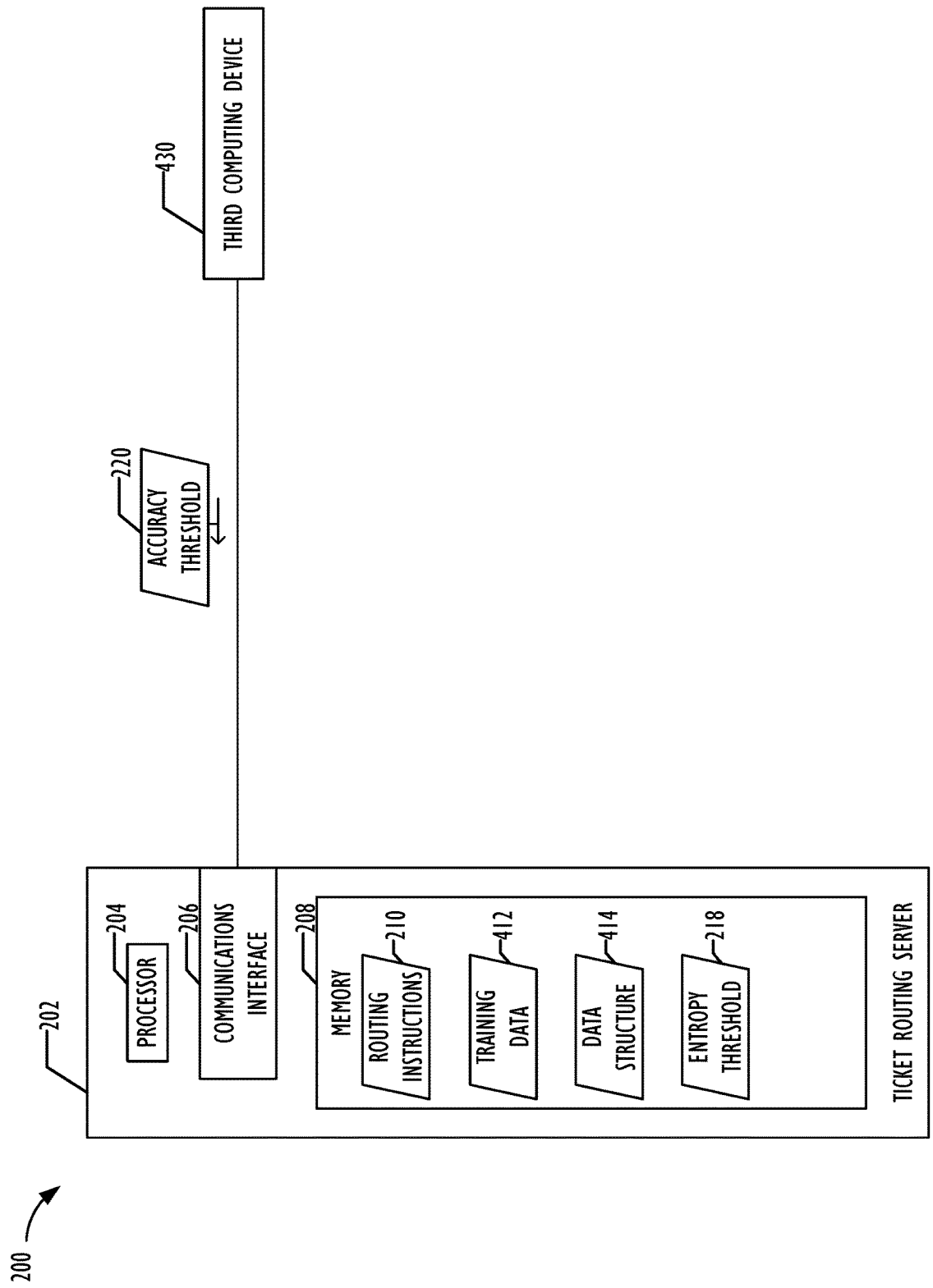
FIG. 4 is another diagram of a system for ticket routing.

Referring to FIG. 4, another diagram of the system 200 for ticket routing is shown. The diagram of FIG. 4 illustrates how the ticket routing server 202 may determine the entropy threshold 218.

As illustrated in FIG. 4, the ticket routing server 202 may be in communication with a third computing device 430. The third computing device 430 may correspond to the computing device 230 of FIG. 2, to the second computing device 330 of FIG. 3, or may be a different device. The third computing device 430 may include a workstation, a server, a mobile device, an internet of things device, or another type of computing device. In some implementations, the third computing device 430 corresponds to one or more of the client devices 104A-C of FIG. 1, the MID server 106, the edge device 116, or a combination thereof. While illustrated as directly coupled to the ticket routing server 202, the third computing device 430 may communicate with the ticket routing server 202 via a network.

In operation, the ticket routing server 202 may receive the accuracy threshold 220 from the third computing device 430. For example, the ticket routing server 202 may provide a web interface for configuration. A user of the third computing device 430 may access the web interface and provide the accuracy threshold 220. In some examples, the ticket routing server 202 may receive the accuracy threshold 220 during a factory setup process.

The processor 204 may generate the entropy threshold 218 based on a data structure 414 stored in the memory device 208 and based on the accuracy threshold 220. For example, the data structure 414 may map accuracy values to entropy values. Thus, based on the accuracy threshold 220, the processor 204 may determine that the entropy threshold 218 corresponds to a particular entropy value that is mapped by the data structure 414 to the accuracy threshold 220. In some embodiments, the processor 204 may identify the entropy threshold 218 by interpolating values in the data structure 414. In some implementations, the data structure 414 corresponds to a table.

As described below with reference to FIG. 4, the processor 204 may generate the data structure 414 based on training data 412. The training data 412 may correspond to a set of tickets and associated descriptions. Each ticket in the training data 412 may further include an indication of whether the ticket routing server 202 correctly routed the ticket. For examples, the training data 412 may be generated by inputting each ticket of the set of tickets to the ticket routing server 202. After the ticket routing server 202 routes the set of tickets, a user or system may indicate whether each of the tickets was correctly routed. The set of tickets may include sample tickets generated for the purpose of training the ticket routing server 202, tickets routed during the course of normal operations of the ticket routing server 202, or a combination thereof.

Figure 5:
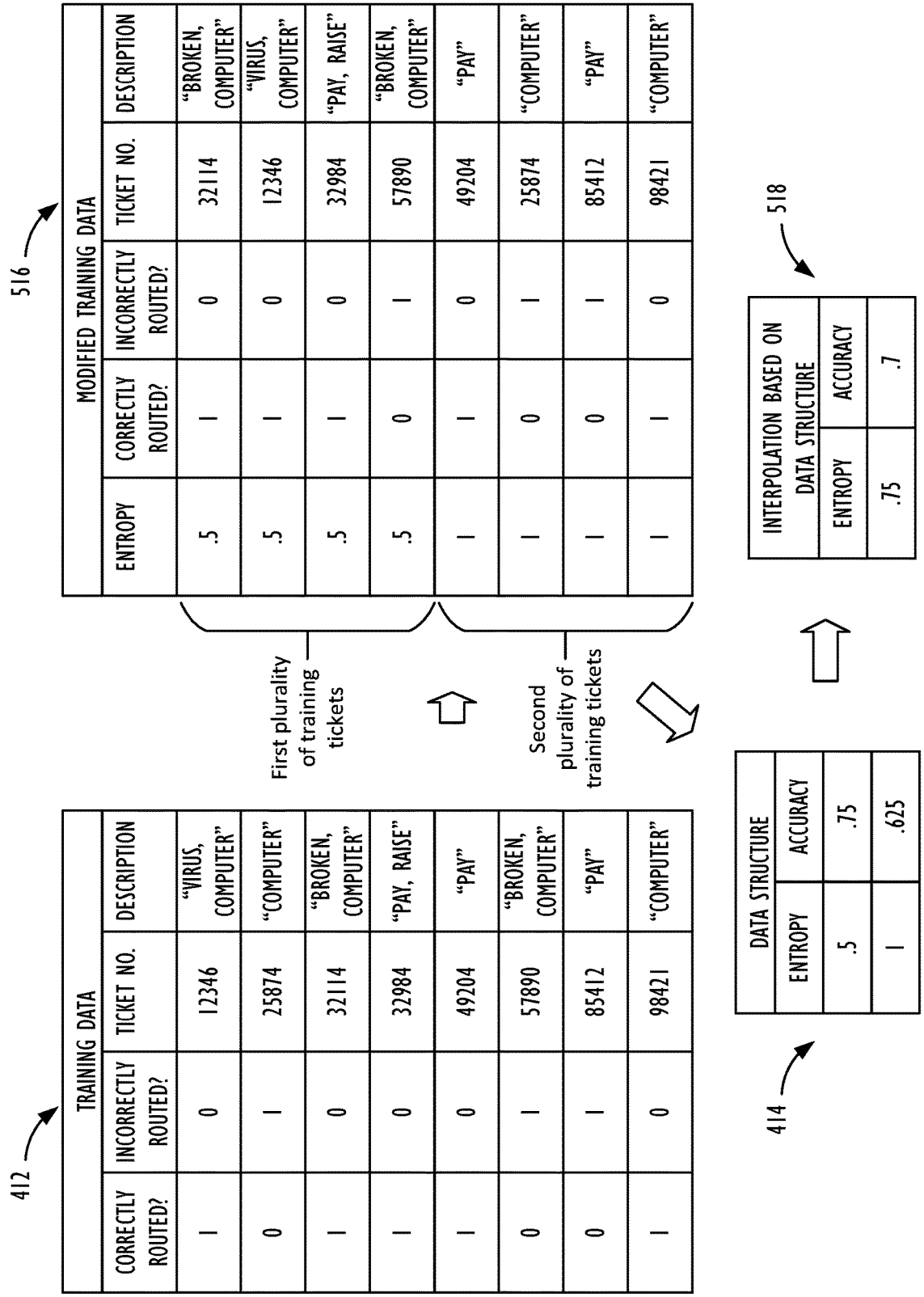
FIG. 5 is a diagram illustrating generation of a data structure associating entropy and accuracy based on training data.

Referring to FIG. 5, a diagram illustrating generation of the data structure 414 based on the training data 412 is illustrated. As illustrated in FIG. 5, the training data 412 includes a set of tickets. Each ticket includes a ticket number (e.g., a ticket identifier), a description, and an indication of whether the ticket was correctly routed. For example, the training data includes a ticket number 12346 that was correctly routed and includes a description with keywords "virus" and "computer."

The processor 204 may calculate an entropy value for each ticket in the set of tickets included in the training data 412. For example, based on the description of the ticket 12346, the processor 204 may calculate a probability vector $[P(x_1) \ldots P(x_n)]$, where each element $P(x_i)$ indicates a probability that the ticket 12346 should be routed to a corresponding category $x_i$. The processor 204 may calculate the entropy of the ticket 12346 based on the probability vector. For example, the entropy may equal $-\Sigma_1^n P(x_i) \log_b P(x_i)$, where b may be any number. The processor 204 may identify subsets of tickets of the set of tickets based on the entropy values calculated for each ticket in the set of tickets. As illustrated in FIG. 5, the modified training data 516 includes a first plurality of training tickets associated with an entropy value of "0.5" and a second plurality of training tickets associated with an entropy value of "1."

Since accuracy relative to a maximum entropy threshold, $entropy_{max}$ may be defined as $Accuracy(entropy_{max})$ is equal to the number of tickets having entropy values less than or equal to $entropy_{max}$ divided by the total number tickets having entropy values less than or equal to $entropy_{max}$, the processor 204 may calculate accuracy values for each entropy value included in the modified training data 516. For example, the processor 204 may determine that setting $entropy_{max}$ to 0.5 will yield 0.75 accuracy as follows. The number of correctly routed tickets in the set of tickets that are associated with an entropy value less than or equal to 0.5 is 3. The number of tickets in the set of tickets that are associated with an entropy value less than or equal to 0.5 is 4. Thus, Accuracy (0.5)=¾. Further, the processor 204 may determine that setting $entropy_{max}$ to 1 will yield 0.625 accuracy as follows. The number of correctly routed tickets in the set of tickets that are associated with an entropy value less than or equal to 1 is 5. The number of tickets in the set of tickets that are associated with an entropy value less than or equal to 1 is 8. Thus, Accuracy (1)=⅝.

The processor 204 may utilize the data structure 414, as described above, to identify the entropy threshold 218 based on the accuracy threshold 220. For example, in response to the accuracy threshold 220 indicating an accuracy of 0.75, the processor 204 may set the entropy threshold 218 to 0.5. As a further example, in response to the accuracy threshold 220 indicating an accuracy of 0.625, the processor 204 may set the entropy threshold 218 to 1. In response to the accuracy threshold 220 not being included in the data structure 414, the processor 204 may generate an interpolation 518 based on the data structure 414. For example, in response to the accuracy threshold 220 indicating an accuracy of 0.7, the processor 204 may interpolate data included in the data structure 414 to set the entropy threshold 218 to 0.75.

Thus, FIG. 5 illustrates how a processor may generate and use a data structure to identify an entropy threshold based on a given accuracy threshold. Automatically routing ticket data based on an entropy value satisfying the entropy threshold may reduce a number of devices that receive ticket data that would be more appropriately received by a different device. Accordingly, the ticket routing server 202 may operate more accurately as compared to other ticket routing servers. Accordingly, the disclosure represents an improvement to computer technology.

Figure 6:
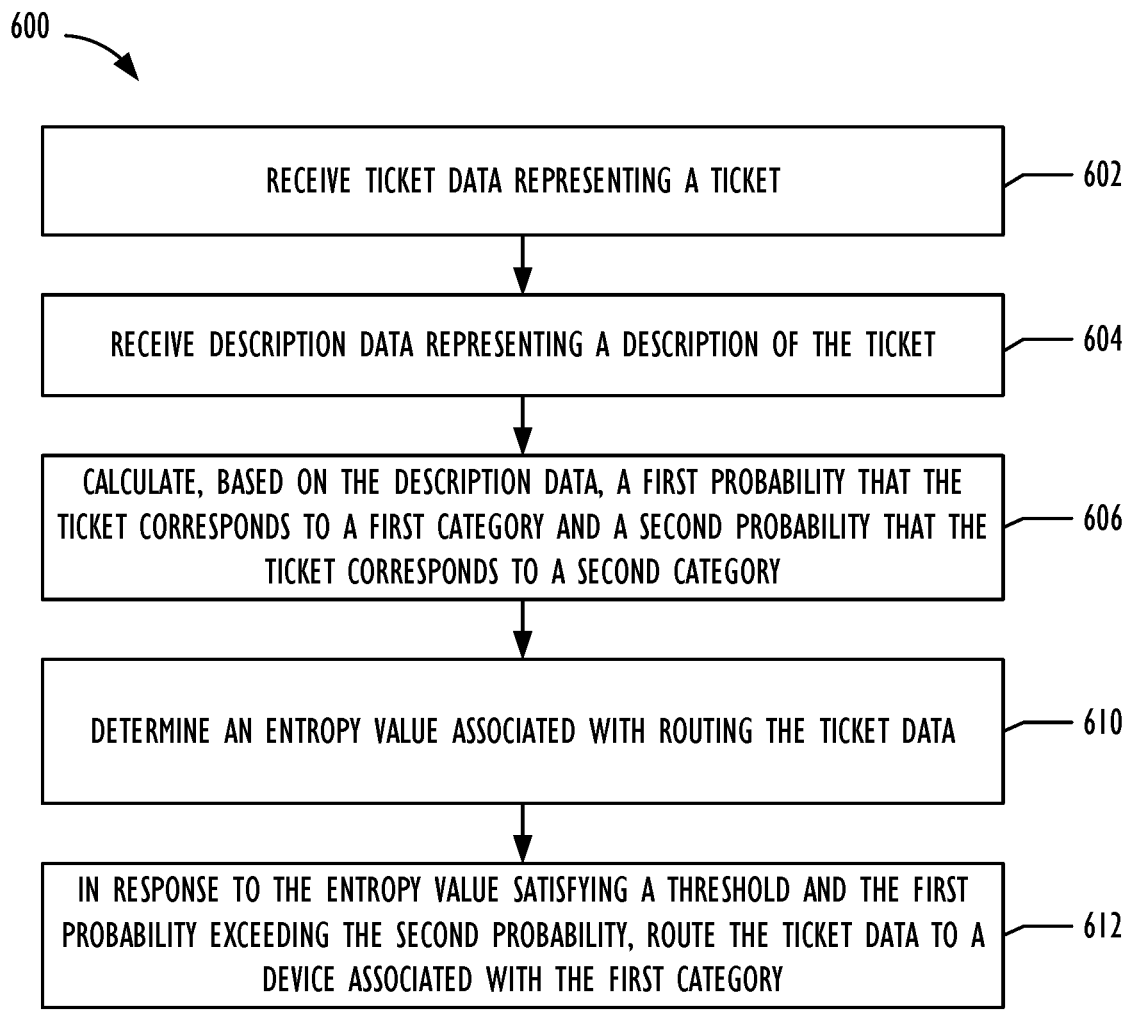
FIG. 6 is a flowchart illustrating a method of ticket routing.

Referring to FIG. 6, a flowchart illustrating a method 600 for ticket routing is shown. The method 600 may be implemented by a computing device, such as the ticket routing server 202. The method 600 includes receiving ticket data representing a ticket, at 602. For example, the processor 204 of the ticket routing server 202 may receive the ticket data 232.

The method 600 further includes receiving description data representing a description of the ticket, at 604. For example, the processor 204 may receive the description data 234. The method 600 further includes calculating, based on the description data, a first probability that the ticket corresponds to a first category and a second probability that the ticket corresponds to a second category, at 606. For example, the processor 204 may calculate the first probability 212 based on the description data 234. The first probability 212 may indicate a probability that the ticket data 232 corresponds to (e.g., should be routed to) the first device 240 associated with the first category (e.g., human resources). The processor 204 may further calculate the second probability 214 based on the description data 234. The second probability 214 may indicate a probability that the ticket data 232 corresponds to (e.g., should be routed to) the second device 250 associated with the second category (e.g., information technology).

The method 600 further includes determining an entropy value associated with routing the ticket data, at 610. For example, the processor 204 may determine the entropy value 216 based on the first probability 212 and the second probability 214. In response to the entropy value satisfying a threshold and the first probability exceeding the second probability, the method 600 includes routing the ticket data to a device associated with the first category, at 612. For example, the processor 204 may determine to automatically route the ticket data 232 based on the entropy value 216 satisfying the entropy threshold 218. In response to the first probability 212 exceeding the second probability 214, the processor 204 may automatically route the ticket data 232 to the first device 240 associated with the first category (e.g., human resources).

Thus, the method 600 may enable ticket data to be automatically routed based on an entropy value of the ticket data. Automatically routing ticket data based on an entropy value may reduce a number of devices that receive ticket data that would be more appropriately received by a different device. Accordingly, the ticket routing server 202 may operate more accurately as compared to other ticket routing servers. Accordingly, the disclosure represents an improvement to computer technology.

Figure 7:
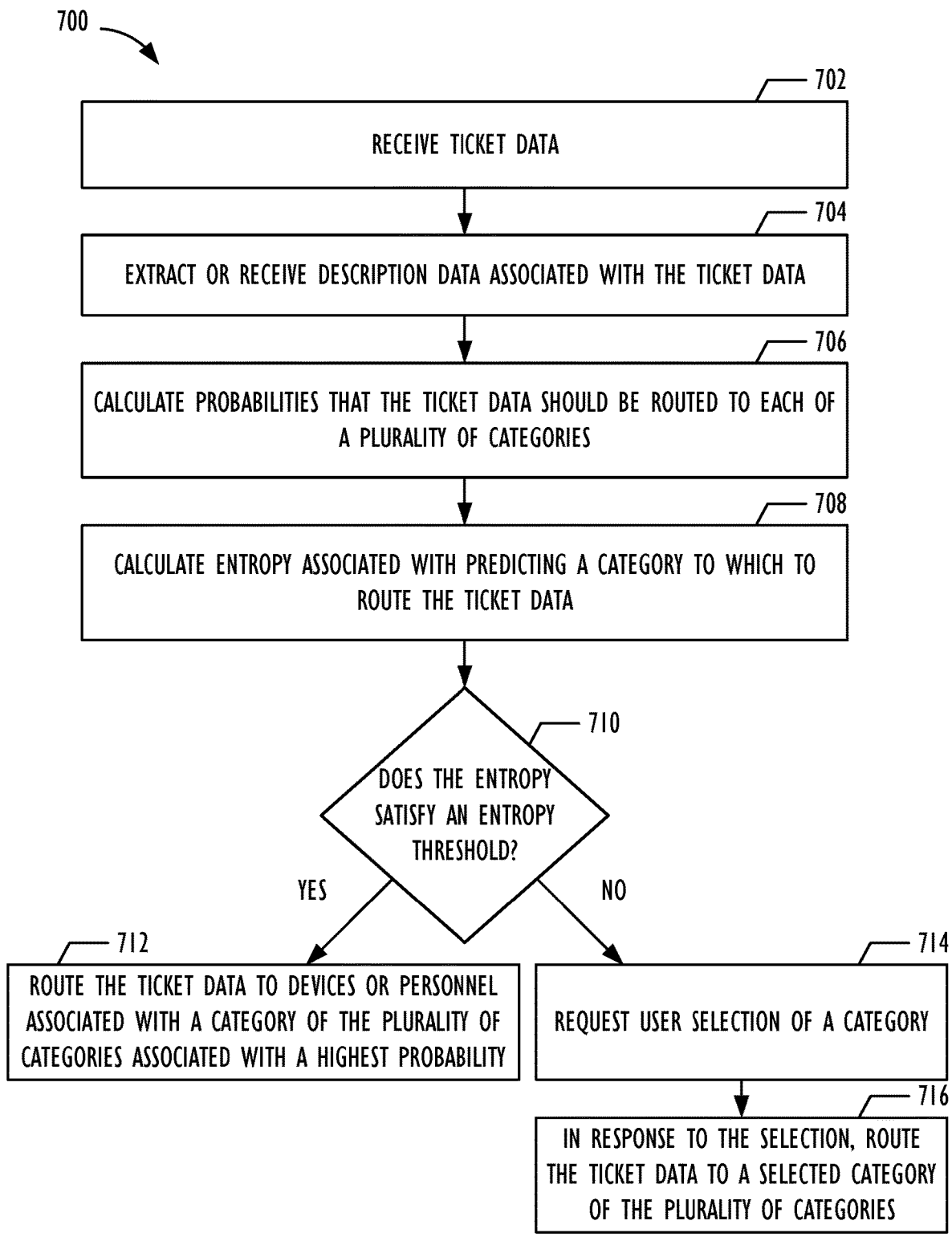
FIG. 7 is a flowchart illustrating another method of ticket routing.

Referring to FIG. 7, a flowchart illustrating another method 700 for ticket routing is shown. The method 700 may be implemented by a computing device, such as the ticket routing server 202. The method 700 includes receiving ticket data, at 702. For example, the processor 204 of the ticket routing server 202 may receive the ticket data 232 or the second ticket data 332.

The method 700 further includes extracting or receiving description data associated with the ticket data, at 704. For example, the processor 204 may receive or extract the description data 234 or the second description 234. The method 700 further includes calculating probabilities that the ticket data should be routed to each of a plurality of categories, at 706. For example, the processor 204 may determine the first probability 212 and the second probability 214 based on the description data 234. The first probability 212 may indicate a probability that the ticket data 232 should be routed to the first device 240 associated with the first category. The second probability 214 may indicate a probability that the ticket data 232 should be routed to the second device 250 associated with the second category. As another example, the processor 204 may determine the third probability 312 and the fourth probability 314 based on the second description data 334. The third probability 312 may indicate a probability that the second ticket data 332 should be routed to the third device 340 associated with the third category. The fourth probability 314 may indicate a probability that the second ticket data 332 should be routed to the fourth device 350 associated with the fourth category.

The method 700 further includes calculating an entropy associated with predicting a category to which to route the ticket data, at 708. For example, the processor 204 may calculate the entropy value 216 based on the first probability 212 and the second probability 214. The entropy value 216 may indicate a degree of uncertainty as to whether a routing decision made by the ticket routing server 202 regarding the ticket data 232 will be correct. As another example, the processor 204 may calculate the second entropy value 316 based on the third probability 312 and the fourth probability 414. The second entropy value 316 may indicate a degree of uncertainty as to whether a routing decision made by the ticket routing server 202 regarding the second ticket data 332 will be correct.

The method 700 further includes determining whether the entropy satisfies an entropy threshold, at 710. For example, the processor 204 may determine whether the entropy value 216 satisfies the entropy threshold 218. As another example, the processor 204 may determine whether the second entropy value 316 satisfies the entropy threshold 218.

In response to the entropy satisfying the entropy threshold, the method 700 further includes routing the ticket data to devices or personnel associated with a category of the plurality of categories associated with a highest probability, at 712. For example, in response to determining that the entropy value 216 satisfies the entropy threshold 218, the processor 204 may route the ticket data 232 to the first device 240 associated with the first category.

In response to the entropy not satisfying the entropy threshold, the method 700 further includes requesting user selection of a category, at 714. For example, in response to determining that the second entropy value 316 does not satisfy the entropy threshold 218, the processor 204 may initiate transmission, to the second computing device 330, of the request 336 for selection. The request 336 for selection 330 may cause the second computing device 330 to prompt a user for input identifying a category. The method 700 further includes, in response to the selection, routing the ticket data to a selected category of the plurality of categories, at 716. For example, in response to the selection 338, the processor 204 may route the second ticket data 332 to the third device 340 associated with the third category.

Thus, the method 700 may enable ticket data to be automatically routed based on an entropy value of the ticket data. Automatically routing ticket data based on an entropy value may reduce a number of devices that receive ticket data that would be more appropriately received by a different device. Accordingly, the ticket routing server 702 may operate more accurately as compared to other ticket routing servers. Accordingly, the disclosure represents an improvement to computer technology.

Figure 8:
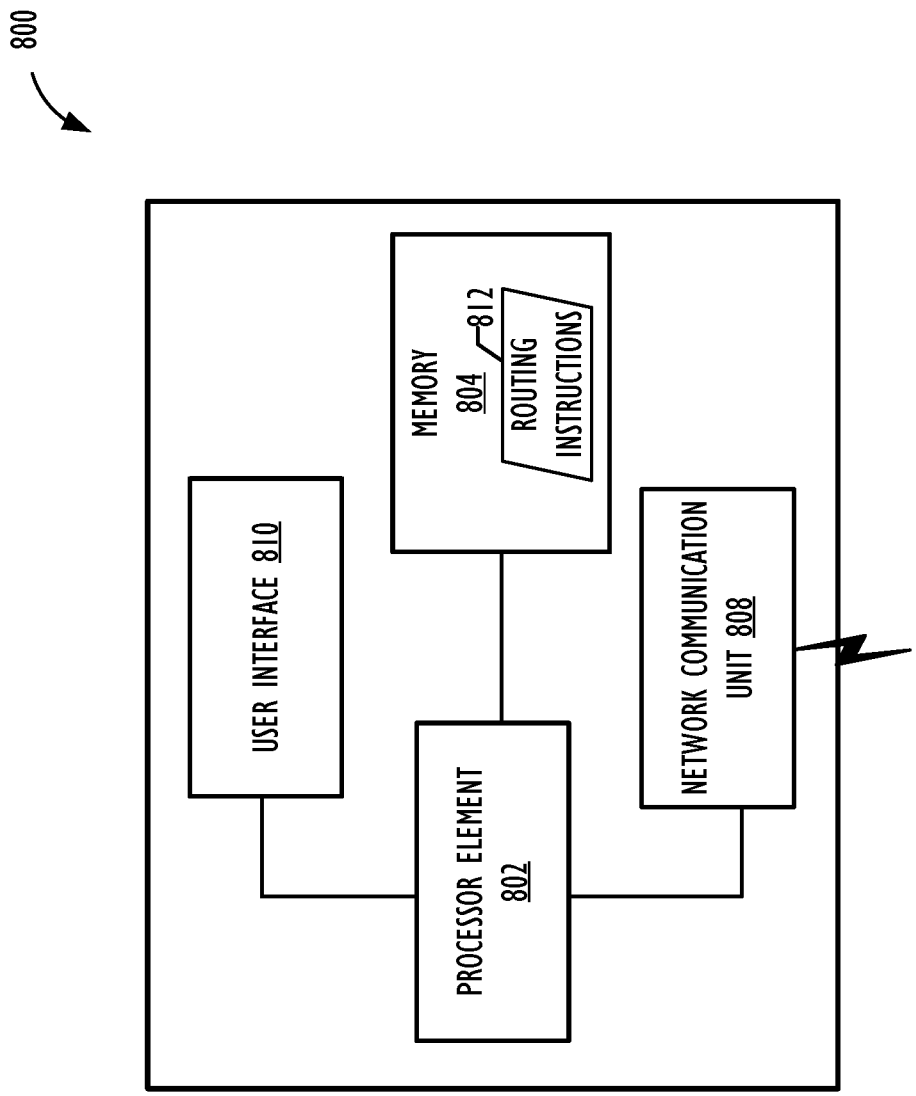
FIG. 8 is a block diagram illustrating another embodiment of computing system for use with techniques described herein.

Referring now to FIG. 8, a block diagram illustrates a computing device 800 that may be used for implementing the techniques described herein in accordance with one or more embodiments. For example, the computing device 800 illustrated in FIG. 8 could represent a client device or a physical server device. In some implementations, the computing device 800 corresponds to the ticket routing server 202. As shown in FIG. 8, the computing device 800 can include one or more input/output devices, such as a network communication unit 808 that could include a wired communication component and/or a wireless communications component, which can be coupled to processing element 802. The network communication unit 808 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi, and/or other communication methods.

The computing system 800 includes a processing element 802 that contains one or more hardware processors, where each hardware processor may have a single or multiple processor cores. In one embodiment, the processing element 802 may include at least one shared cache that store data (e.g., computing instructions) that are utilized by one or more other components of processing element 802. For example, the shared cache may be locally cache data stored in a memory for faster access by components of the processing elements 802. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 8, the processing element 802 may also include one or more other types of hardware processing components, such as graphics processing units (GPU), application specific integrated circuits (ASICs), field-programmable gate arrays (FPGAs), and/or digital signal processors (DSPs).

FIG. 8 illustrates that memory 804 may be operatively coupled to processing element 802. Memory 804 may be a non-transitory medium configured to store various types of data. For example, memory 804 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution. In the illustrated example, the memory 804 stores routing instructions 812. The routing instructions 812 may be executable by the processor 802 to perform any of the operations of methods described with respect to FIGS. 1-7.

Persons of ordinary skill in the art are aware that software programs may be developed, encoded, and compiled in a variety computing languages for a variety software platforms and/or operating systems and subsequently loaded and executed by processing element 802. In one embodiment, the compiling process of the software program may transform program code written in a programming language to another computer language such that the processing element 802 is able to execute the programming code. For example, the compiling process of the software program may generate an executable program that provides encoded instructions (e.g., machine code instructions) for processor 802 to accomplish specific, non-generic, particular computing functions.

After the compiling process, the encoded instructions may then be loaded as computer executable instructions or process steps to processing element 802 from storage (e.g., memory 804) and/or embedded within the processing element 802 (e.g., cache). Processing element 802 can execute the stored instructions or process steps in order to perform instructions or process steps to transform the computing device into a non-generic, particular, specially programmed machine or apparatus. Stored data, e.g., data stored by a storage device, can be accessed by processing element 802 during the execution of computer executable instructions or process steps to instruct one or more components within the computing device 800.

A user interface 810 can include a display, positional input device (such as a mouse, touchpad, touchscreen, or the like), keyboard, or other forms of user input and output devices. The user interface 810 can be coupled to processor element 802. Other output devices that permit a user to program or otherwise use the computing device can be provided in addition to or as an alternative to network communication unit 808. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 800 may comprise other components well known in the art, such as sensors, powers sources, and/or analog-to-digital converters, not explicitly shown in FIG. 8. For ease of discussion, FIG. 8 explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A method for ticket routing, comprising:
receiving, at a processor, ticket data representing a ticket;
receiving, at the processor, description data representing a description of the ticket;
calculating, based on the description data, a first probability that the ticket corresponds to a first category and a second probability that the ticket corresponds to a second category;
determining an entropy value associated with routing the ticket data;
in response to the entropy value satisfying an entropy threshold and the first probability exceeding the second probability, routing the ticket data to a device associated with the first category;
receiving, at the processor, second ticket data representing a second ticket;
receiving, at the processor, second description data representing a second description of the second ticket; and
in response to a second entropy value not satisfying the entropy threshold, initiating, by the processor, transmission of a request for a selection indicating that the second ticket corresponds to one of a third category or a fourth category, the second entropy value associated with categorization of the second ticket data.

2. The method of claim 1, comprising initiating, by the processor, routing of the second ticket data to a second device associated with the selection.

3. The method of claim 1, wherein the request indicates that a third probability that the second ticket corresponds to the third category exceeds a fourth probability that the second ticket corresponds to the fourth category.

4. The method of claim 1, wherein initiating transmission of the request includes initiating, by the processor, output of the request to a user interface device.

5. The method of claim 1, comprising initiating, by the processor, storage in a memory device of an association between the selection and the second description data.

6. The method of claim 5, comprising initiating, by the processor, routing of third ticket data to a second device based on the association.

7. The method of claim 1, comprising:
receiving, at the processor, communication data representing a communication associated with the ticket; and
determining, by the processor, the description data based on the communication data.

8. The method of claim 7, wherein the communication data includes audio data, text data, or a combination thereof.

9. The method of claim 7, wherein the communication is between a virtual agent and another entity.

10. A method for ticket routing, comprising:
receiving, at a processor, ticket data representing a ticket;
receiving, at the processor, description data representing a description of the ticket;
calculating, based on the description data, a first probability that the ticket corresponds to a first category and a second probability that the ticket corresponds to a second category;
selecting, by the processor, an entropy threshold based on a data structure mapping a plurality of entropy values to a plurality of accuracy values and based on accuracy input indicating an accuracy threshold;
determining an entropy value associated with routing the ticket data; and
in response to the entropy value satisfying the entropy threshold and the first probability exceeding the second probability, routing the ticket data to a device associated with the first category.

11. The method of claim 10, wherein the data structure comprises a table.

12. The method of claim 10, comprising interpolating, by the processor, the entropy threshold based on the data structure and the accuracy input.

13. The method of claim 10, comprising generating, by the processor, the data structure by:
receiving, at the processor, training data representing set of training tickets;
determining a first plurality of training tickets of the set of training tickets and a second plurality of training tickets of the set of training tickets, the first plurality of training tickets associated with a first entropy value and the second plurality of training tickets associated with a second entropy value;
mapping the first entropy value to a first accuracy value associated with categorization of the first plurality of training tickets; and
mapping the second entropy value to a second accuracy value associated with categorization of the second plurality of training tickets.

14. The method of claim 13, comprising determining the first accuracy value based on a count of tickets included in the first plurality of training tickets and classified as correctly categorized.

15. The method of claim 14, wherein the first accuracy value corresponds to a ratio of the count to a second count of tickets included in the first plurality of training tickets.

16. An apparatus including:
a processor; and
a memory device storing instructions that, when executed by the processor, cause the processor to perform operations including:
receiving ticket data representing a ticket;
receiving description data representing a description of the ticket;
calculating, based on the description data, a first probability that the ticket corresponds to a first category and a second probability that the ticket corresponds to a second category;
determining an entropy value associated with routing the ticket data;
in response to the entropy value satisfying an entropy threshold and the first probability exceeding the second probability, routing the ticket data to a device associated with the first category;
receiving second ticket data representing a second ticket;
receiving second description data representing a second description of the second ticket; and
in response to a second entropy value not satisfying the entropy threshold, initiating transmission of a request for a selection indicating that the second ticket corresponds to one of a third category or a fourth category, the second entropy value associated with categorization of the second ticket data.

17. The apparatus of claim 16, comprising an output interface configured to transmit the ticket data to the device responsive to a command from the processor.

18. A non-transitory, computer-readable storage medium storing instructions that, when executed by a processor, cause the processor to perform operations including:
   receiving ticket data representing a ticket;
   receiving description data representing a description of the ticket;
   calculating, based on the description data, a first probability that the ticket corresponds to a first category and a second probability that the ticket corresponds to a second category;
   selecting an entropy threshold based on a data structure mapping a plurality of entropy values to a plurality of accuracy values and based on accuracy input indicating an accuracy threshold;
   determining an entropy value associated with routing the ticket data; and
   in response to the entropy value satisfying the entropy threshold and the first probability exceeding the second probability, routing the ticket data to a device associated with the first category.

19. The non-transitory, computer-readable storage medium of claim 18, wherein the ticket is associated with a request for human resources aid, and wherein the first category corresponds to a first human resources department and the second category corresponds to a second human resources department.

* * * * *